US008761394B2

(12) United States Patent
Beals et al.

(10) Patent No.: US 8,761,394 B2
(45) Date of Patent: Jun. 24, 2014

(54) SYSTEM AND METHOD FOR SECURE BROADCAST COMMUNICATION

(75) Inventors: William Michael Beals, Englewood, CO (US); David A. Kummer, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1235 days.

(21) Appl. No.: 11/693,076

(22) Filed: Mar. 29, 2007

(65) Prior Publication Data

US 2008/0159538 A1    Jul. 3, 2008

Related U.S. Application Data

(60) Provisional application No. 60/877,932, filed on Dec. 28, 2006.

(51) Int. Cl.
*H04K 1/00* (2006.01)
*H04L 9/08* (2006.01)
*H04L 9/32* (2006.01)

(52) U.S. Cl.
CPC .. *H04L 9/08* (2013.01); *H04L 9/32* (2013.01); *H04L 2209/601* (2013.01)
USPC .......................................... 380/270; 380/255

(58) Field of Classification Search
CPC ........ H04L 9/08; H04L 9/32; H04L 2209/601
USPC ........ 725/31, 63, 68; 380/210, 227, 228, 239; 713/189, 193; 726/9, 27
See application file for complete search history.

(56) References Cited

U.S. PATENT DOCUMENTS

| | | | | |
|---|---|---|---|---|
| 4,807,286 A * | 2/1989 | Wiedemer | ...................... | 380/230 |
| 5,600,844 A * | 2/1997 | Shaw et al. | .................... | 715/273 |
| 5,621,793 A * | 4/1997 | Bednarek et al. | ............. | 380/240 |
| 6,513,104 B1 * | 1/2003 | Gaskins | ........................ | 711/169 |
| 6,711,683 B1 * | 3/2004 | Laczko et al. | ................. | 713/189 |
| 6,738,905 B1 * | 5/2004 | Kravitz et al. | ................. | 713/194 |
| 7,110,006 B2 * | 9/2006 | MacInnis et al. | ............. | 345/629 |
| 7,248,070 B1 * | 7/2007 | Guilloteau et al. | ............. | 326/38 |
| 7,492,897 B1 * | 2/2009 | Eskicioglu et al. | ........... | 380/231 |
| 7,590,243 B2 * | 9/2009 | Kahn et al. | ..................... | 380/239 |
| 2001/0013098 A1 * | 8/2001 | Angelo et al. | ................ | 713/200 |
| 2002/0114465 A1 * | 8/2002 | Shen-Orr et al. | ............. | 380/231 |
| 2003/0163706 A1 * | 8/2003 | Cocchi et al. | ................. | 713/182 |
| 2003/0163713 A1 * | 8/2003 | Cocchi et al. | ................. | 713/189 |
| 2006/0041903 A1 * | 2/2006 | Kahn et al. | ...................... | 725/28 |
| 2006/0059372 A1 * | 3/2006 | Fayar et al. | ..................... | 713/192 |
| 2007/0174621 A1 * | 7/2007 | Ducharme | .................... | 713/176 |
| 2007/0294745 A1 * | 12/2007 | Tan et al. | ........................... | 726/2 |

* cited by examiner

*Primary Examiner* — Jeffrey Pwu
*Assistant Examiner* — Nega Woldemariam
(74) *Attorney, Agent, or Firm* — Ingrassia Fisher & Lorenz, P.C.

(57) ABSTRACT

A method for providing a communication device access to a secure broadcast communication is presented. In the method, an encrypted message originating outside the communication device is received into an electronic component of the communication device. The encrypted message is then decrypted within the electronic component, resulting in a decrypted message. The decrypted message is then verified. In response to verifying the decrypted message, a disabled circuit of the electronic component is enabled to allow the communication device to access the secure broadcast communication.

33 Claims, 4 Drawing Sheets

SYSTEM AND METHOD FOR SECURE BROADCAST COMMUNICATION

CROSS-REFERENCE TO RELATED APPLICATIONS

This application claims the benefit of U.S. Provisional Application No. 60/877,932, filed Dec. 28, 2006, which is hereby incorporated herein by reference in its entirety.

BACKGROUND

Reception of broadcast programming, such as digital video and audio, by way of satellite communication has become both convenient and commonplace. Typically, a satellite communication receiver, an associated satellite dish, and a paid subscription to a satellite broadcast service are all that are required for a customer to receive many different types of programming, including news, sports, and entertainment broadcasts. Generally, the programming may include a basic package of programming to which the customer may subscribe for a monthly fee. In addition, the customer may receive premium programming and various one-time events for an additional amount, thus providing the subscriber flexibility in the programming received and the amount paid therefor. However, though many consumers consider subscription rates for satellite programming to be at least reasonable when compared to alternative forms of communication, others will go to great lengths to obtain satellite broadcast service illegally without subscribing to the service.

To prevent piracy of satellite broadcast service, a combination of electronic hardware, software and data encryption technology is often employed to allow only valid subscribers to receive the satellite broadcast service. Most programming transmitted from the satellite is typically encrypted, or "scrambled," requiring the receiver to decrypt the programming through use of a security "key" or other information in conjunction with a decryption algorithm. In a typical example, each satellite receiver contains a reader unit into which is installed a "smart card," which provides security for the broadcast communications. More specifically, the smart card normally contains information identifying the particular programming a user of the satellite receiver is licensed to receive, as well as the information necessary to decrypt the programming.

After a customer subscribes to a particular set of programming available through the satellite communication service and configures the satellite receiver for operation, a satellite transmits one or more messages intended for that specific receiver to program the smart card with the necessary information to allow the receiver to receive and display the appropriate programming. These messages may also include the information required to decrypt the programming. When the consumer alters their subscription, these changes are also made in the smart card via satellite.

While various security measures are implemented to prevent unauthorized access to the security keys within the smart card, determined individuals, given enough time and resources, ultimately may be able to defeat those measures, allowing them free unauthorized access to the satellite broadcast services. Such a possibility is a primary reason why the smart card is used as a security device, since changes in those measures to eliminate unauthorized access may be implemented by issuing each authorized subscriber a new smart card incorporating a new security implementation. As a result, replacement of the entire receiver to alter the security measures is avoided.

Nonetheless, given the intelligence and persistence of those determined to defeat the security measures and obtain satellite broadcast service illegally, additional enhancements to the security of such services that makes unauthorized access to programming more difficult are often desirable.

DETAILED DESCRIPTION

Figure 1:
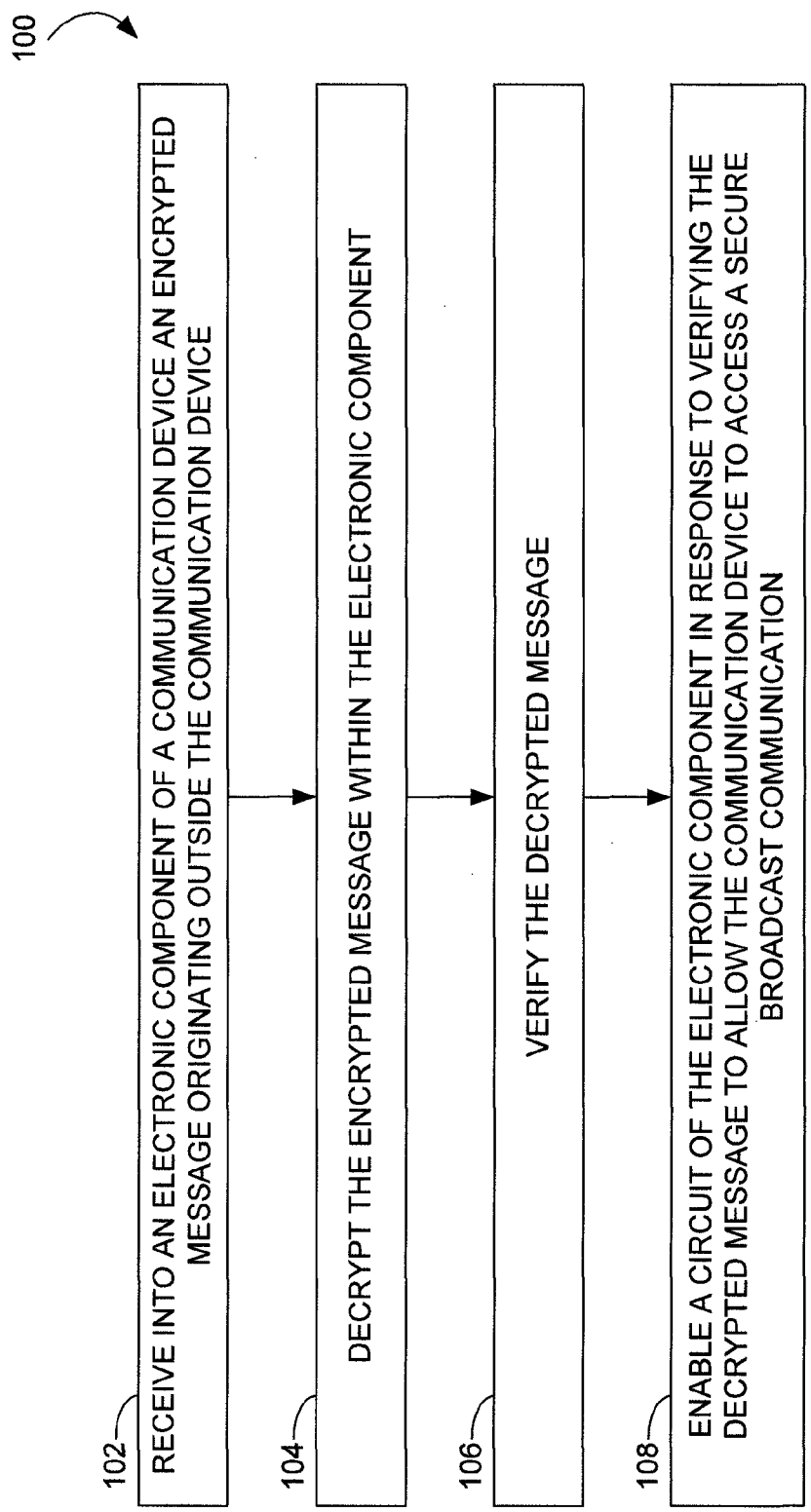
FIG. 1 is a flow diagram of a method according to an embodiment of the invention for providing a communication device access to a secure broadcast communication.

FIG. 1 provides a flow diagram of a method 100 for providing a communication device access to a secure broadcast communication. In the method 100, an encrypted message originating outside the communication device is received into an electronic component of the communication device (operation 102). The encrypted message is decrypted within the electronic component (operation 104). The decrypted message is then verified (operation 106). In response to verifying the decrypted message, a disabled circuit of the electronic component is enabled to allow the communication device to access the secure broadcast communication (operation 108).

Figure 2:
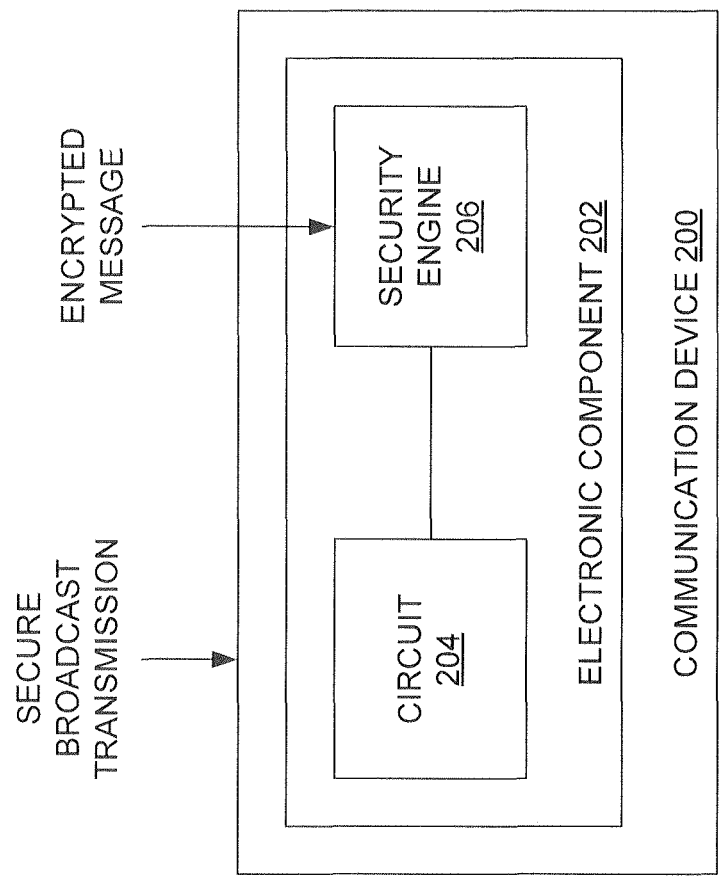
FIG. 2 is a block diagram of a communication device for receiving a secure broadcast communication according to an embodiment of the invention.

Another embodiment, a communication device 200 for receiving a secure broadcast communication is shown in FIG. 2. The device 200 includes an electronic component 202 that includes a circuit 204 that, when enabled, allows the communication device 200 to access the secure broadcast communication. Also included in the electronic component 202 is a security engine 206 configured to receive and decrypt an encrypted message originating external to the communication device 200. The security engine 206 also verifies the decrypted message. In response to verifying the decrypted message, the security engine 206 enables the circuit 204, if previously disabled, thus allowing the communication device 200 to access the secure broadcast communication.

Figure 3:
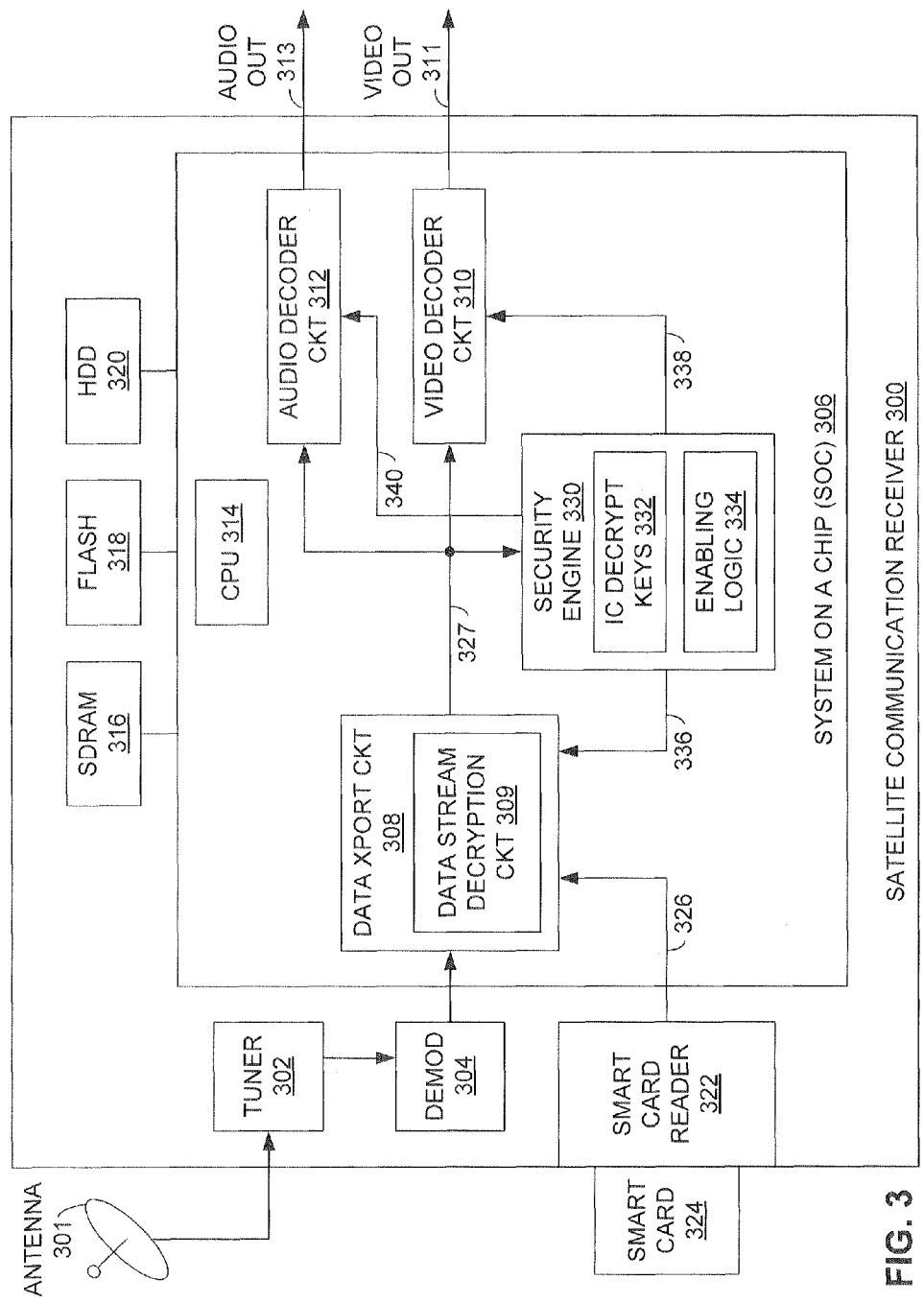
FIG. 3 is a block diagram of a communication device for receiving a secure broadcast communication according to another embodiment of the invention.

Another embodiment of the invention—a satellite communication receiver 300—is depicted in the block diagram of FIG. 3. One particular term often used for such a receiver 300 is a "set-top box," although other terms referencing the receiver 300 have also been utilized. While the following discussion focuses exclusively on the use of embodiments of the invention within the context of satellite broadcast receivers and programming, equipment involved in the reception of other forms of communication, such as various types of wireline and wireless communication, may also benefit from application of the embodiments discussed below. In addition, the satellite broadcast receiver 300 represents just one particular example of such a receiver; many variations of the configuration discussed below are possible while still benefiting from various aspects of the embodiments discussed herein.

In FIG. 3, the satellite communication receiver 300 employs an external antenna 301, such as a satellite dish, to receive radio frequency (RF) signals from one or more satellite transponders transmitting broadcast video and audio programming. Each satellite may host one or more such transponders. The RF signals are transferred by a cable to a tuner 302, which selects RF signals transmitted from a particular transponder. The selected RF signal is then transferred to a demodulator 304, which demodulates the RF signals into digital data, which are then forwarded to a system-on-a-chip (SOC) integrated circuit (IC) 306. The digital data is typically organized into data packets, and is scrambled or encrypted to prevent unauthorized access thereto, as described above.

In the particular embodiment of FIG. 3, the SOC 306 resides within an IC package that is soldered directly to a large printed circuit board (PCB), or "motherboard," of the satellite communication receiver 300. Thus, for all practical purposes, the SOC 306 is a substantially non-removable electronic component of the receiver 300, since once the SOC 306 is attached to the board, removal of the SOC 306 from the board would most likely result in rendering the SOC 306, and thus the receiver 300, inoperable.

The SOC 306 performs a number of functions required in the receiver 300. For example, the SOC 306 receives the demodulated digital data from the demodulator 304 into a data transport circuit 308. The data transport circuit 308 employs a data stream decryption circuit 309 to decrypt the incoming digital data. The decryption circuit 309 utilizes a decryption algorithm and one or more data stream decryption keys 326 received from a smart card 324 inserted into a smart card reader 322 of the satellite communication receiver 300. Any encrypted programming received into the data transport circuit 308 for which the associated decryption key 326 is not held in the smart card 324 cannot be correctly decrypted, and thus is of no use to other portions of the SOC 306. Thus, the smart card 324 provides security against unauthorized access to secure satellite-based programming.

If, instead, the decryption keys 326 are available for the digital data associated with a particular source, program, or event being received into the data transport circuit 308, the data is decrypted into a decrypted data stream 327 and subsequently forwarded to other circuitry, such as the video decoder circuit 310 and the audio decoder circuit 312. In one embodiment, the decrypted data stream 327 received by the video decoder circuit 310 and the audio decoder circuit 312 is encoded according to a format of the Motion Picture Experts Group (MPEG), such as MPEG-2 or MPEG-4. The resulting decoded data from the video decoder circuit 310 and the audio decoder circuit 312 are then forwarded to a video out connection 311 and an audio out connection 313, respectively, for transfer to a user output device (not shown in FIG. 3), such as a television or audio system.

In the embodiment of FIG. 3, a central processing unit (CPU) 314 is integrated within the SOC 306 to control the operation of the various internal circuits of the SOC 306, such as the data transport circuit 308, the data decryption circuit 309, the video decoder circuit 310 and the audio decoder circuit 312. Other circuitry possibly incorporated into the SOC 306, but not shown in FIG. 3, includes a remote control circuit and a universal asynchronous receiver/transmitter (UART), for example.

In one embodiment, several other components may be coupled with the SOC 306 to facilitate normal operations of the satellite communication receiver 300. For example, as shown in FIG. 3, one or more synchronous dynamic random-access memories (SDRAMs) 316 may be employed to hold digital data being processed by portions of the SOC 306, such as the data transport circuit 308, the video decoder circuit 310, the audio decoder circuit 312 and the CPU 314. Also, a flash memory 318 may be utilized to hold firmware to be executed by the CPU 314. Additionally, a hard disk drive (HDD) 320 may be installed within the receiver 300 and coupled with the SOC 306 to allow storage of broadcast programming for later playback to the user. The HDD 320 may also contain other information requiring long-term non-volatile storage.

While the smart card 324 helps prevent unauthorized access to satellite-based programming on a source, program or event basis, an additional form of security may be beneficial in ensuring satellite-based programming security. To this end, the SOC 306 of FIG. 3 includes a security engine 330. In this particular example, the security engine 330 includes an IC decryption key 332, as well as enabling logic 334 which employs the IC decryption key 332 to enable the operation of one or more of the other circuits within the SOC 306. In FIG. 3, the circuits that may be disabled include the data transport circuit 308, the data stream decryption circuit 309, the video decoder 310, and the audio decoder 312, although any other circuit within the SOC 306 necessary for proper operation of the receiver 300 may be disabled in other embodiments. The enabling logic may enable or disable each of the circuits 308, 309, 310, 312 by way of a control signal 336, 338, 340, the operation of which is described in greater detail below. Therefore, at least in one embodiment, the security engine 330 provides a means by which the SOC 306 or some portion thereof may be enabled or disabled, depending on the subscription status of the user.

Figure 4:
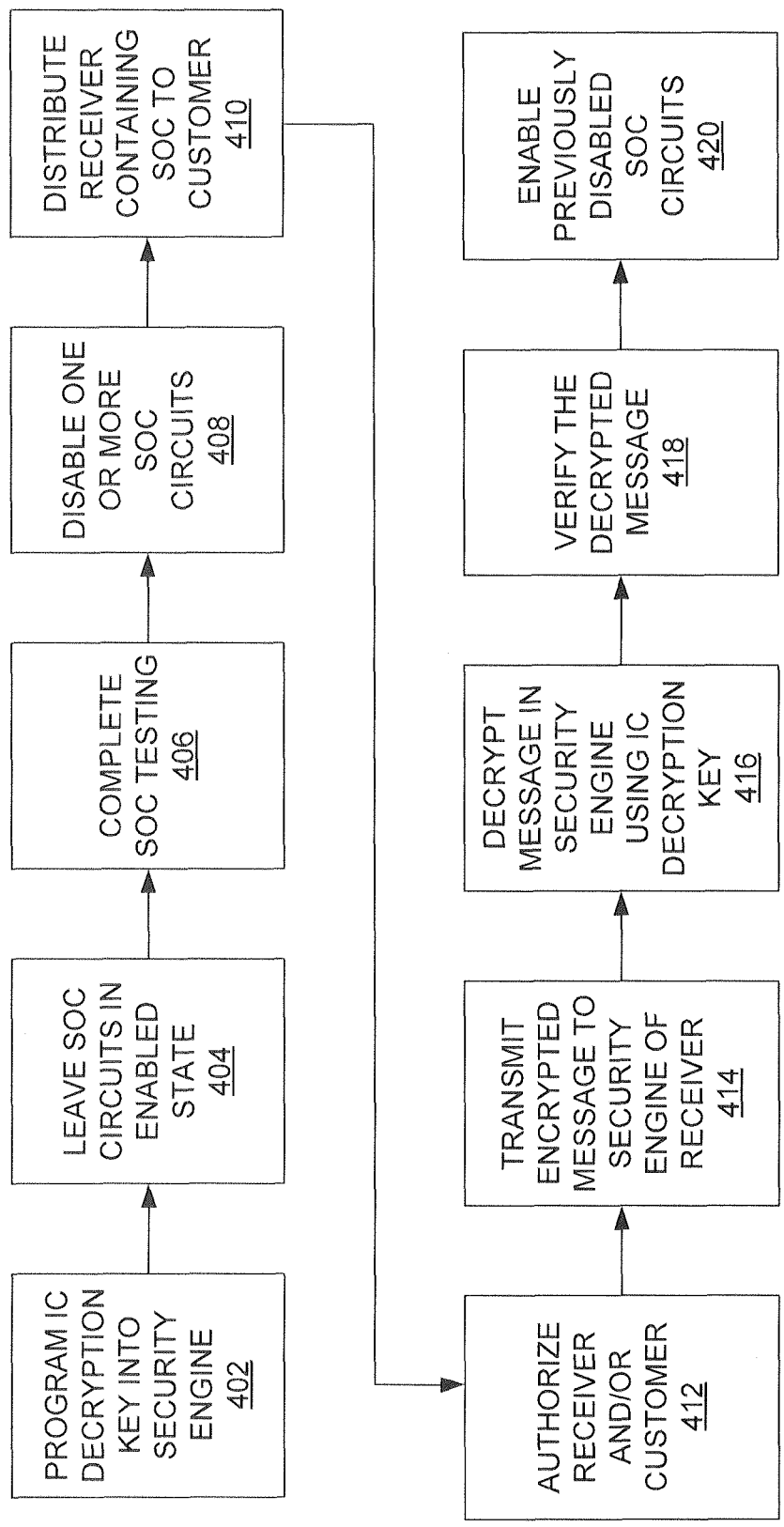
FIG. 4 is a flow diagram of a method according to another embodiment of the invention for providing the communication device of FIG. 3 access to a secure broadcast communication.

FIG. 4 illustrates a possible method 400 for operating the satellite communication receiver 300. In one embodiment, the decryption key 332 is programmed into the security engine 330 during fabrication of the SOC 306 (operation 402). In one implementation, the key 332 may be represented as a set of fusible links within the SOC 306 that are irreversibly programmed by the SOC 306 manufacturer. In another example, the key 332 is coded into a set of non-volatile memory (NVM) cells within the SOC 306. Other methods of representing a read-only numeric or binary value, such as hard-coding the value with permanent connections to logic LOW and HIGH values, are also possible. Generally, the key 332 is configured within the SOC 306 such that determination of the key 332 by electronic probing at the input/output pins of the SOC 306 or similar means is impractical.

In one embodiment, each SOC 306 contains a unique decryption key 332 so that each receiver 300 distributed to a customer is associated with a different key 332. As a result, the unauthorized discovery of a decryption key 332 associated with a particular SOC 306 would not be useful in enabling a circuit within another SOC 306 associated with another satellite communication receiver 300. In another example, the decryption key 332 is "global," or is the same for each SOC 306 manufactured. Generally, the longer the decryption key 332, the less likely the key 332 may be discovered through trial and error.

In one implementation, all circuits of the SOC 306 may be in an enabled state after completion of the fabrication of the SOC 306 (operation 404) to allow complete testing of the SOC 306 (operation 406). Such testing may include, for example, functional testing, parametric margin testing and burn-in testing of the SOC 306, either before or after installation of the SOC 306 onto the motherboard of the receiver 300. After the completion of such testing, the SOC 306 may then be configured to disable one or more of the circuits within the SOC 306 (operation 408). For example, the enabling logic 334 of the security engine 330 may be configured to disable one or more circuits, such as the data transport circuit 308, the data stream decryption circuit 309, the video decoder 310, or the audio decoder 312, to render inoperative at least part of the functionality of the SOC 306. More specifically, the circuit 308, 309, 310, 312 may be disabled by way of a command or signal issued to the SOC 306 by way of test equipment or other electronic means. The command or signal may cause a first fusible link, NVM cell, or other electronic means to change state. That state change may, in turn, alter the state of the control signal 336, 338, 340 received by the circuit 308, 309, 310, 312, thus disabling that circuit. For example, the enabling logic 334 may disable the video decoder 310 by way of its associated control signal 338, thus preventing any video data transferred from the data transport circuit 309 to the video decoder 310 from being decoded and forwarded to the video out connection 311 for display to a television or similar device. In one embodiment, the decryption key 332 is not required to disable the one or more circuits 308, 309, 310, 312, although requiring use of the key 332 to disable the one or more circuits 308, 309, 310, 312 may be desirable in other implementations.

Once one or more of the circuits 308, 309, 310, 312 is disabled, the receiver 300 containing the SOC 306 may be distributed to a customer subscribing to one or more satellite broadcast services (operation 410). To enable the receiver 300 to allow receipt of such programming, the customer may contact the provider of the satellite broadcast services to supply information required by the service provider to authorize the use of the receiver 300 (operation 412). Such information may include, for example, a valid credit card number and a verifiable billing name and address.

Once the customer is authorized, the provider may then remotely enable the one or more previously disabled circuits 308, 309, 310, 312 of the receiver 300 (see operations 414-420). In one embodiment, the provider causes an encrypted message for enabling the disabled circuit to be transmitted to the receiver 300 (operation 414). In one embodiment, the message may be encrypted according to a public-key encryption algorithm, a private-key encryption algorithm, a symmetric-key encryption algorithm, or some other encryption algorithm which may be decrypted using the decryption key 332 residing within the security engine 330. In one implementation, the message is transmitted by way of satellite via the antenna or dish 301 to the communication receiver 300, which then by way of the tuner 302 and the demodulator 304 is received into the data transport circuit 309 of the SOC 306. The data transport circuit 309 then forwards the encrypted message to the security engine 330. The message may include a header or other information informing the data transport circuit 309 to forward the message to the security engine 330 regardless of whether the data transport circuit 309 is enabled to perform other functions by way of its control signal 336. In another example, the security engine 330 may receive the message through another communication connection, such as a telephone line, an Internet connection, or another communication path not explicitly shown in FIG. 3.

After the encrypted message is received at the security engine 330, the enabling logic 334 may employ the key 332 to decrypt the encrypted message (operation 416), resulting in a decrypted message. The enabling logic 334 then verifies the decrypted message to ensure that the message was decrypted correctly and that the message is requesting that the one or more disabled circuits 308, 309, 310, 312 be enabled (operation 418). Upon successful verification of the decrypted message, the enabling logic 334 may then alter the state of one or more of the control signals 336, 338, 340 to enable the circuit 308, 309, 310, 312 receiving the control signal, thus allowing proper operation of the SOC 306 (operation 420). In one example, if the video decoder circuit 310 is disabled prior to the decryption of the message, the enabling logic 334 may respond to the successful decryption of the message by programming a second fusible link, or reverting a state of the NVM cell mentioned above, to alter the state of the corresponding control signal 338 to enable the video decoder circuit 310. As a result of the security engine 330 enabling one or more of the circuits 308, 309, 310, 312 of the SOC 306, access to various programming channels may then be controlled by way of the security measures provided by the smart card 324, as described above.

Optionally, instead of disabling the one or more circuits 308, 309, 310, 312 of the SOC 306 prior to distributing the associated communication receiver 300 to a customer, the circuit may remain enabled for some period of time after distribution. Under this scenario, the security measures provided by the security engine 330 of the SOC 306 may remain latent or dormant until some later time after the communication receiver 300 has been placed into service. For example, presuming a major security breach of the smart card 324 has occurred, thereby allowing a significant number of unauthorized users access to one or more programming services, the enabling logic 334 may be employed to disable one or more of the circuits 308, 309, 310, 312 of the SOC 306 by way of the first fusible link or NVM cell mentioned above. This operation may be initiated in one implementation by way of a broadcast message, such as a message transmitted from a satellite through the antenna 301 associated with one or more satellite communication receivers 300, thus disabling some or all of the receivers 300 receiving information from the satellite transmitting the message. Each authorized receiver 300 may then be re-enabled by way of the encrypted message described above, thus leaving each of the unauthorized receivers 300 disabled, regardless of any circumvention of the security measures of the smart card 324.

As described above, various embodiments of the present invention provide a means of preventing unauthorized access to a secure broadcast communication. By implementing these security measures within an electronic component of the receiving communication device, opportunity for compromising that security is reduced due to a lack of access to the internal circuitry of the electronic component.

While several embodiments of the invention have been discussed herein, other embodiments encompassed by the scope of the invention are possible. For example, while some embodiments of the invention are described above in specific reference to satellite broadcast communications, other communication devices involving other forms of communication, such as wireline, wireless, or optical communications, may benefit from application of the concepts described herein. Further, the ability of a communication device to transmit as well as to receive a broadcast communication may be controlled by the security measures detailed herein. Also, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims.

What is claimed is:

1. A method for enabling providing a communication device to decrypt and decode a secure broadcast communication, the method comprising:
distributing to a customer a communication device, the communication device comprising:
a first circuit that, when enabled, performs at least one function supportive of the decryption, the decoding, or the decryption and decoding of the secure broadcast communications, the communication device fabricated with the first circuit enabled; and a security engine operably coupled to an input of the first circuit and configured to apply thereto a control signal, the first circuit configured to switch between enabled and disabled states in response to changes in the control signal;

authorizing the customer as properly subscribed to one or more satellite broadcast services; and after authorizing the customer as properly subscribed to one or more satellite broadcast services, transmitting an encrypted message to the communication device instructing the security engine to alter the state of the control signal applied to the first circuit to enable the first circuit and allow use of the communication device in decrypting and decoding the secure broadcast communication.

2. The method of claim 1, wherein the secure broadcast communication comprises a satellite broadcast communication, and the communication device comprises a satellite communication receiver.

3. The method of claim 2, wherein the encrypted message originates from a communication satellite.

4. The method of claim 1, wherein the security engine comprises an integrated circuit soldered to a motherboard of the communication device.

5. The method of claim 1, wherein the first circuit comprises at least one of a video decoding circuit, an audio decoding circuit, a video decrypting circuit and a data transport circuit.

6. The method of claim 1, wherein the first circuit is enabled by setting a fusible link contained within the communication device.

7. The method of claim 1, wherein the encrypted message is encrypted using one of public-key encryption, private-key encryption, and symmetric-key encryption.

8. The method of claim 1, wherein the security engine comprises a security key, wherein the security engine employs the security key to decrypt the encrypted message.

9. The method of claim 8, wherein the security key is unique when compared to a security key of an electronic component of another communication device.

10. The method of claim 8, wherein the security key is programmed within the security engine during fabrication of the electronic component.

11. The method of claim 8, wherein the security key is programmed within the security engine by way of one of a set of fusible links.

12. The method of claim 1, further comprising disabling the first circuit before distributing the communication device to the customer to prevent use of the communication device in the decryption and decoding of the secure broadcast communication.

13. The method of claim 12, wherein disabling comprises, prior to distributing the communication device to the customer, utilizing test equipment to change the state of an electronic element included within the communication device to alter the state of the control signal applied by the security engine to the first circuit and disable the first circuit.

14. The method of claim 1 wherein distributing comprises distributing the communication device to the customer with the first circuit enabled, and wherein disabling comprises disabling the circuit remotely by transmitting a message to the communication device after distributing the communication device to the customer.

15. The method of claim 14, wherein the communication device is utilized in conjunction with a smart card, and wherein transmitting comprises transmitting a broadcast message to the communication device to disable the first circuit after distributing the communication device to the customer in response to a security breach of the smart card allowing unauthorized access to programming services.

16. A communication device for receiving a secure broadcast communication, the communication device comprising:
an electronic component comprising:
a circuit configured to allow the communication device to access the secure broadcast communication when the circuit is enabled; and
a security engine operably coupled to an input of the circuit and configured to apply thereto a control signal, the circuit configured to switch between enabled and disabled states in response to changes in the control signal, the security engine configured to receive and decrypt an encrypted broadcast message originating external to the communication device to yield a decrypted message, to verify the decrypted message and, if the circuit is disabled, to enable the circuit in response to verifying the decrypted message.

17. The communication device of claim 16, wherein the secure broadcast communication comprises a satellite broadcast communication, and the communication device comprises a satellite communication receiver.

18. The communication device of claim 17, wherein the encrypted message originates from a communication satellite.

19. The communication device of claim 16, wherein the electronic component comprises an integrated circuit soldered to a motherboard of the communication device.

20. The communication device of claim 16, wherein the circuit comprises at least one of a video decoding circuit, an audio decoding circuit, a video decrypting circuit and a data transport circuit.

21. The communication device of claim 16, wherein the security engine is further configured to set a fusible link within the security engine to enable the circuit.

22. The communication device of claim 16, wherein the encrypted message is encrypted using one of public-key encryption, private-key encryption, and symmetric-key encryption.

23. The communication device of claim 16, wherein the security engine comprises a security key, wherein the security engine employs the security key to decrypt the encrypted message.

24. The communication device of claim 23, wherein the security key is unique when compared to a security key of an electronic component of another communication device.

25. The communication device of claim 23, wherein the security key is programmed within the security engine during fabrication of the electronic component.

26. The communication device of claim 23, wherein the security key is programmed within the security engine by way of a set of fusible links.

27. A broadcast television receiver for receiving a secure broadcast communication, the broadcast television receiver comprising:
an integrated circuit comprising:
a first circuit configured to allow the broadcast television receiver to access the secure broadcast communication when the first circuit is enabled, wherein the first circuit comprises at least one of a video decoding circuit; and
a security engine configured to receive and decrypt an encrypted message originating external to the broadcast television receiver to yield a decrypted message, to verify the decrypted message and, if the first circuit is disabled, to enable the first circuit in response to verifying the decrypted message;

wherein the security engine is operably coupled to an input of the first circuit and configured to apply thereto a control signal, wherein the first circuit is configured to switch between enabled and disabled states in response to changes in the control signal, wherein the first circuit is prevented from decoding any video data when the first circuit is disabled, and wherein the communication device is further configured to disable the circuit in response to transmission of a broadcast message to the communication device after distribution of the communication device to a customer.

28. A communication device, comprising:

a first electronic component comprising:
- a first circuit configured to receive a first secure data stream, perform one or more processing operations on the first secure data stream and output one or more second data streams, wherein the one or more second data streams are based, at least in part, upon the results of the one or more processing operations;
- at least one second circuit, connected to the first circuit, and configured to receive and further process at least one of the one or more second data streams; and
- a security engine, connected to the first circuit and the at least one second circuit, configured to receive, decrypt and verify a first message;

wherein the security engine, upon receiving, decrypting, and verifying the first message, disables at least one of the first circuit and the at least one second circuit.

29. The communication device of claim 28, comprising:

a second electronic component, configured to receive, decrypt and verify a second message;

wherein the received, decrypted and verified second message is utilized by the second electronic component to support the first circuit in performing the one or more processing operations on the first data stream.

30. The communication device of claim 29, wherein the second electronic component comprises a smart card reader.

31. The communication device of claim 28, wherein the first electronic component comprises a system on a chip.

32. The communication device of claim 28, wherein the at least one second circuit comprises an audio decoder circuit.

33. The communication device of claim 28, wherein the first circuit comprises a data stream decryption circuit.

* * * * *